United States Patent
Shepherd

(10) Patent No.: US 6,529,995 B1
(45) Date of Patent: Mar. 4, 2003

(54) METHOD AND APPARATUS FOR MAINTAINING AND RESTORING MAPPING TABLE ENTRIES AND DATA IN A RAID SYSTEM

(75) Inventor: David L. Shepherd, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/336,065

(22) Filed: Jun. 18, 1999

(51) Int. Cl.$^7$ .............................................. G06F 12/00
(52) U.S. Cl. ........................ 711/114; 711/170; 707/203; 707/511
(58) Field of Search ................................ 711/114, 112, 711/165, 154, 170; 707/10, 202, 206, 3, 203, 511; 714/20

(56) References Cited

U.S. PATENT DOCUMENTS

| | | | |
|---|---|---|---|
| 5,086,428 A | * 2/1992 | Perlman et al. ............. 370/394 |
| 5,121,495 A | * 6/1992 | Nemes ........................... 707/3 |
| 5,403,639 A | * 4/1995 | Belsan et al. ................ 707/204 |
| 5,404,361 A | * 4/1995 | Casorso et al. ................ 714/52 |
| 5,475,834 A | * 12/1995 | Anglin et al. ................ 707/203 |
| 5,481,694 A | * 1/1996 | Chao et al. .................. 711/112 |
| 5,544,347 A | 8/1996 | Yanai et al. |
| 5,673,382 A | * 9/1997 | Cannon et al. ................. 714/6 |
| 5,742,792 A | 4/1998 | Yanai et al. |
| 5,778,395 A | * 7/1998 | Whiting et al. ............. 707/204 |
| 5,794,253 A | * 8/1998 | Norin et al. ................. 707/203 |
| 5,812,748 A | 9/1998 | Ohran et al. |
| 5,832,222 A | 11/1998 | Dziadosz et al. |
| 5,835,953 A | 11/1998 | Ohran |
| 5,893,120 A | * 4/1999 | Nemes ........................ 707/206 |
| 5,978,791 A | * 11/1999 | Farber et al. ................ 707/200 |
| 6,088,720 A | * 7/2000 | Berkowitz et al. .......... 709/206 |
| 6,351,467 B1 | * 2/2002 | Dillon ......................... 709/227 |
| 6,353,878 B1 | * 3/2002 | Dunham ...................... 707/10 |
| 6,363,462 B1 | * 3/2002 | Bergsten ..................... 707/203 |

\* cited by examiner

*Primary Examiner*—Matthew Kim
*Assistant Examiner*—Pierre-Michel Bataille
(74) *Attorney, Agent, or Firm*—Duft, Graziano & Forest; Wayne P. Bailey

(57) ABSTRACT

A method and apparatus are disclosed for the temporary preservation of physical space occupied by modified or deleted data stored in parallel disk drive array data storage subsystems, and for the temporary preservation of associated virtual to logical mapping table entries that describe and locate such temporary physical space. The data storage subsystem functions as a conventional large form factor disk drive memory, using an array of redundancy groups, each containing N+M disk drives. The invention further relates to apparatus for the recording of the occurrence and the timing of changes to mapping table entries and to the processing of such recorded changes in a reverse time sequence to recover previously modified or deleted data, or in a forward time sequence to return data to a more current state.

15 Claims, 9 Drawing Sheets

METHOD AND APPARATUS FOR MAINTAINING AND RESTORING MAPPING TABLE ENTRIES AND DATA IN A RAID SYSTEM

FIELD OF THE INVENTION

This invention relates to computer systems and a high performance, high reliability parallel disk drive array data storage subsystem that includes an efficient data storage management system to dynamically map virtual data storage devices to logical data storage devices, and that includes a deleted data file space release system that releases the physical space occupied by data that is scratched by a host processor and, in particular, to apparatus for the temporary preservation of physical space occupied by previously modified or deleted data stored in the data storage subsystem, and for the temporary preservation of associated virtual to logical mapping table entries that describe and locate such temporary physical space. The invention further relates to apparatus for the recording of the occurrence and the timing of changes to mapping table entries and to the processing of such recorded changes in a reverse time sequence to recover previously modified or deleted data, or in a forward time sequence to return data to a more current state.

PROBLEM

It is a problem in the field of computer systems to restore data that has been accidentally or intentionally modified or deleted. To insure that data can be restored after such events, copies of data, or "backups", are typically stored on disk storage subsystems or magnetic tape media located at a primary business location. Various combinations of hardware and host software functionality are available to help restore data, but typically there is a time gap between the time the last backup was made and the time the damage to the data occurred. If the missing data can not be recreated from other sources, the loss of data is permanent. In any case, negative economic consequences result from the loss of data or the effort to recreate or restore the data.

It is also a problem in the field of computer systems to insure that closely related sets of restored data are consistent with each other. To insure that data can be restored after a natural disaster at a primary business location, copies of data are typically stored on disk storage subsystems at one or more geographically different secondary locations that are connected to the primary location through communications connections. As data is changed at a primary location, a combination of hardware and host software functionality causes these changes to be automatically propagated to the secondary locations through the communications connections, and stored on the disk storage subsystems at the secondary locations. When communications connections between locations are interrupted, or one or more locations experience local disasters, a problem of inconsistent data can be created. Data is inconsistent when one copy of a data set is not identical to another copy, or when a sequence of changes to two or more closely related primary data sets are not fully propagated to all other secondary copies. If a disaster at a primary location occurs over a period of many seconds to minutes, it is vital to know when to stop propagating changes to the secondary locations. The IBM Peer-to-Peer Remote Copy and Geographically Dispersed Parallel Sysplex solutions provide a combination of hardware and host software functionality to detect early warning signs of trouble, and then automatically and simultaneously stop propagating changes to secondary locations, however, a problem with these types of solutions is that they may not recognize in sufficient time that a disaster has started. Partially changed data may therefore be propagated to the secondary locations, and so render the data inconsistent.

SOLUTION

The above-described problems are solved and a technical advance is achieved in the field of computer systems by the temporary preservation of physical space occupied by previously modified or deleted data stored in the data storage subsystem, by the temporary preservation of associated virtual to logical mapping table entries that describe and locate such temporary physical space, by the recording of the occurrence and the timing of changes to mapping table entries (Change Recording), and by the processing of such recorded changes (Change Processing) in a reverse time sequence to recover previously modified or deleted data, or in a forward time sequence to return the data to a more current state.

As in prior art, all new or modified data is written on empty logical tracks and the associated previously modified data is marked as obsolete. When functional space is released by the deleted data file space release system, the deleted data is also marked as obsolete. The resultant "holes" in the logical tracks caused by previously modified or deleted data are removed by a periodic background process known as free space collection. The background free space collection process creates empty logical cylinders by collecting valid data tracks into previously emptied logical cylinders.

In the present invention, Change Recording may be activated or deactivated for one or more functional volumes, for one or more ranges of functional tracks that describe data sets, and for one or more individual functional tracks. When Change Recording is active, all new or modified data for those active volumes and tracks is written on empty logical tracks, but the associated previously modified data is marked as unexpired instead of obsolete. When functional space is released by the deleted data file space release system, the deleted data is also marked as unexpired instead of obsolete. The resultant "holes" in the logical tracks caused by the previously modified or deleted data are preserved until expired by the background free space collection process.

As the background free space collection process examines each unexpired track, a check is made to determine if Change Recording is active for the unexpired track, and if not, existing prior art processes are followed. If Change Recording is active for the unexpired track, the timestamp value in the associated virtual to logical mapping table entry for the unexpired track and the current level of free space in the parallel disk drive array data storage subsystem are used in a method to dynamically determine if the unexpired track should be expired and collected as free space, or should remain unexpired and preserved. As tracks are expired, so is the related Change Record. As the level of free space decreases, the amount of data tracks available for preservation of unexpired data decreases, and thus the maximum preservation time for unexpired data decreases. Conversely, as the level of free space increases, so does the maximum preservation time for unexpired data. The present invention provides for a plurality of methods for dynamically determining the preservation time for unexpired data, such as a function of the available free space or total disk space, or as a variable amount of time based on some internal or external parameter.

When Change Recording is activated, all new or modified data for those active volumes and tracks cause Change Records to be generated and stored on the parallel disk drive array data storage subsystem. The location of old and new data tracks associated with each change is saved in a Change Record. A timestamp value is saved in each Change Record and in the associated virtual to logical mapping table entries for the old and new data tracks. The timestamp value is determined by the parallel disk drive array storage subsystem at the time the change completed. For one or more host processors accessing one or more parallel disk drive array storage subsystems, all host processors and parallel disk drive array storage subsystems are synchronized to a common external time reference to produce a consistent temporal record of change activity. When Change Recording is deactivated, generation of Change Records stops, but a timestamp value continues to be saved in the associated virtual to logical mapping table entries for new or modified data.

Change Processing locates the Change Records relevant to the request, orders the records either in reverse time sequence to restore data to a previous known point of consistency, or in forward time sequence to return data to a more current state, and then processes each Change Record using information such as the locations of the old and new data tracks, to modify the virtual mapping table entries until the desired point in time is reached.

BRIEF DESCRIPTION OF THE DRAWINGS

The appended claims set forth the features of the present invention with particularity. The invention, together with its advantages and as previously described, may be better understood from the following detailed description taken in conjunction with the accompanying drawings of which:

DETAILED DESCRIPTION OF THE PREFERRED EMBODIMENT

Figure 1:
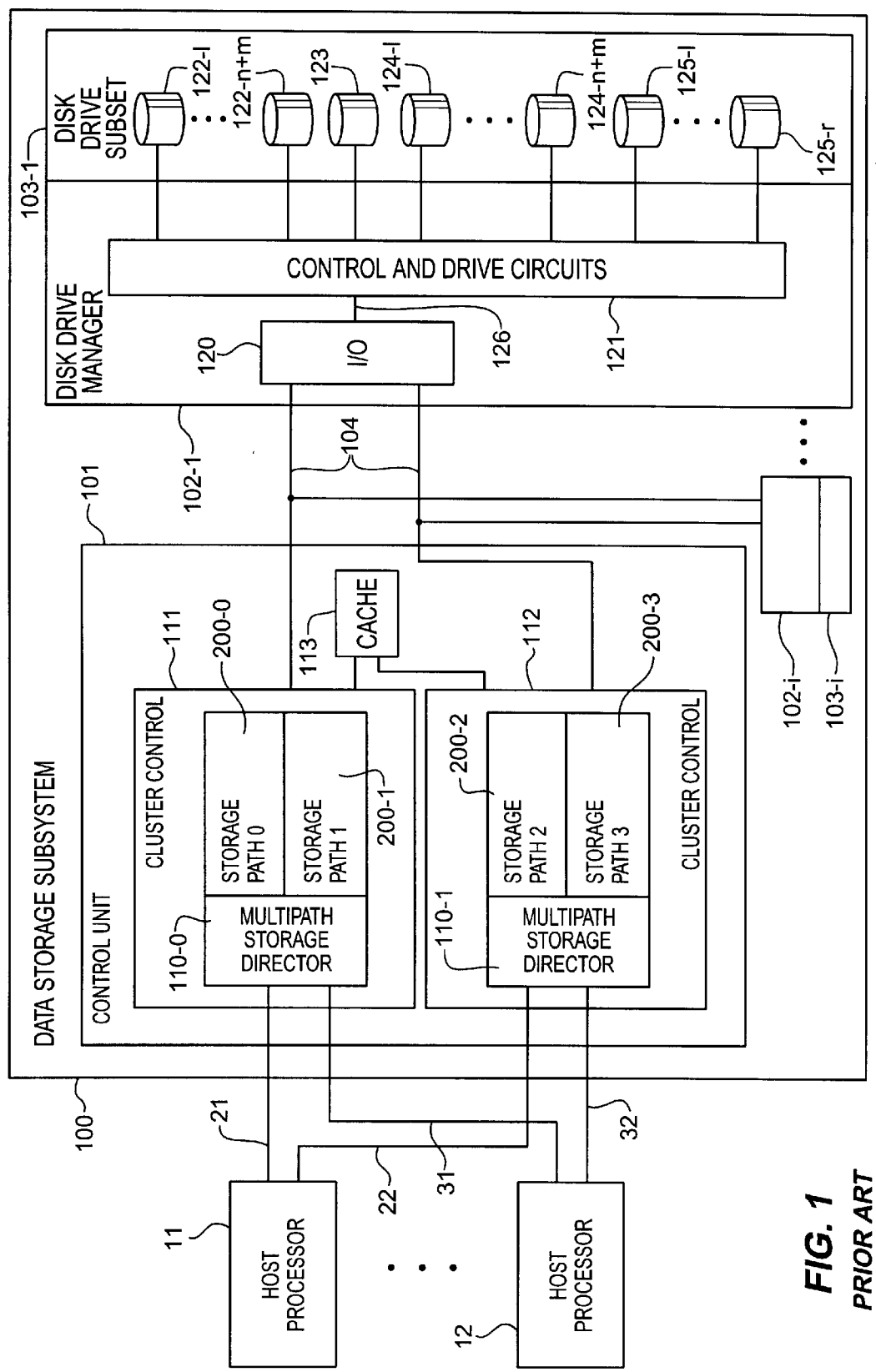
FIG. 1 illustrates in block diagram form the architecture of the parallel disk drive array data storage subsystem.

The present invention provides for maintaining a set of unexpired modified or deleted data which can be used to recover data to a previous point in time, with the unexpired data being intelligently aged (i.e., made expired) and collected by a background free space collection process. This capability is especially important for disaster recovery, and for less intrusive mistakes such as those caused by user or program error where data is wrongly modified or deleted. The present invention preserves the unexpired data based on one or more methods (e.g., time, available space) until it becomes expired and so becomes available for storage of new data. The data storage subsystem of an embodiment of the present invention uses a plurality of small form factor disk drives in place of a single large form factor disk drive to implement an inexpensive, high performance, high reliability disk drive memory that emulates the format and capability of large form factor disk drives. This basic data storage subsystem (without the retention or recovery of previously modified or deleted data of the present invention) was disclosed in Milligan et al., U.S. Pat. No. 5,124,987, issued Jun. 23, 1992, which is hereby incorporated by reference; and in Belsan et al., U.S. Pat. No. 5,193,184, issued Mar. 9, 1993, which is hereby incorporated by reference. The deleted data file space release system was disclosed in Ludlam et al., U.S. Pat. No. 5,459,857, issued Oct. 17, 1995, which is hereby incorporated by reference.

The plurality of disk drives in the parallel disk drive array data storage subsystem are configured into a plurality of variable size redundancy groups of N+M parallel connected disk drives to store data thereon. Each redundancy group, also called a logical disk drive, is divided into a number of logical cylinders, each containing i logical tracks, one logical track for each of the i physical tracks contained in a cylinder of one physical disk drive. Each logical track is comprised of N+M physical tracks, one physical track from each disk drive in the redundancy group. The N+M disk drives are used to store N data segments, one on each of N physical tracks per logical track, and to store M redundancy segments, one on each of M physical tracks per logical track in the redundancy group. The N+M disk drives in a redundancy group have unsynchronized spindles and loosely coupled actuators. The data is transferred to the disk drives via independent reads and writes since all disk drives operate independently. Furthermore, the M redundancy segments, for successive logical cylinders, are distributed across all the disk drives in the redundancy group rather than using dedicated redundancy disk drives. The redundancy segments are distributed so that every actuator in a redundancy group is used to access some of the data segments stored on the disk drives. If dedicated drives were provided for redundancy segments, then these disk drives would be inactive unless redundancy segments were being read from or written to these drives. However, with distributed redundancy, all actuators in a redundancy group are available for data access. In addition, a pool of R globally switchable backup disk drives is maintained in the data storage subsystem to automatically substitute a replacement disk drive for a disk drive in any redundancy group that fails during operation. The pool of R backup disk drives provides high reliability at low cost.

Each physical disk drive is designed so that it can detect a failure in its operation, which allows the M redundancy segments per logical track to be used for multi-bit error correction. Identification of the failed physical disk drive provides information on the bit position of the errors in the logical track and the redundancy data provides information to correct the errors. Once a failed disk drive in a redundancy group is identified, a backup disk drive from the shared pool of backup disk drives is automatically switched in place of the failed disk drive. Control circuitry reconstructs the data stored on each physical track of the failed disk drive, using the remaining N−1 physical tracks of data plus the associated M physical tracks containing redundancy segments of each logical track. A failure in the redundancy segments does not require data reconstruction, but necessitates regeneration of the redundancy information. The reconstructed data is then written onto the substitute disk drive. The use of backup disk drives increases the system reliability of the N+M parallel disk drive architecture while the use of a shared pool of backup disk drives minimizes the cost of providing the improved reliability.

The present invention responds to disk drive failures by marking all mapping table entries as expired and by purging all related change records. This invalidation of mapping table entries and change records ensures that change processing uses accurate information.

The parallel disk drive array data storage subsystem includes a data storage management system that provides improved data storage and retrieval performance by dynamically mapping between virtual and physical data storage devices. The parallel disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the parallel disk drive array data storage subsystem transparent to the host processor, which perceives only the virtual image of the disk drive array data storage subsystem.

The performance of this system is enhanced by the use of a cache memory with both volatile and non-volatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache. The host then modifies some, perhaps all, of the records on the virtual track. Then, as determined by cache replacement methods such as Least Recently Used, etc., the modified virtual track is selected to be destaged to a redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N−1 other physical tracks to form the N data segments of a logical track.

The parallel disk drive array data storage subsystem includes a deleted data file space release system that provides facilities in a dynamically mapped virtual memory data storage subsystem to immediately release the physical space occupied by a deleted data set for use by the data storage subsystem to store subsequently received data files. This system also provides data security by preventing the unauthorized access to the data of scratched data files, both in cache memory and on the data storage devices. The present invention reverses the accomplishment of the prior art, but only to a limited degree, and only for a limited time. The ability to initiate Change Recording and Change Processing is controlled in the host software by use of a well-known security mechanism that compares the identity of the requestor to a set of previously established security permissions and either grants or denies the request. Also, since change records are kept only on a temporary basis, no permanent data security exposure is reintroduced that undermines the effect of the deleted data file space release system as disclosed in Ludlam et al., U.S. Pat. No. 5,459,857, issued Oct. 17, 1995, which is hereby incorporated by reference.

As new or modified data is written, the original, unmodified data is marked as unexpired, and marked with a timestamp. As data is modified or deleted, the redundancy groups increasingly contain numerous tracks of unexpired and obsolete data, causing the total available free space of the data storage subsystem to decrease. To counteract this effect, a background free space collection process periodically examines logical cylinders containing unexpired or obsolete data to determine if the valid data may be relocated elsewhere and so transform the logical cylinder into contiguous free space. If the logical cylinder contains no unexpired tracks, the remaining valid tracks in the logical cylinder are read to the cache memory, and are then written to a previously emptied logical cylinder. The "collected" logical cylinder is then marked empty and the process is repeated until all logical cylinders are examined. If the logical cylinder contains any unexpired tracks, further processing of the logical cylinder is bypassed and the next logical cylinder is examined. Thus, all redundancy data creation, writing and free space collection occurs in background, rather than on-demand processes. This arrangement avoids the parity update problem of existing disk array systems and improves the response time versus access rate performance of the data storage subsystem by transferring these overhead tasks to background processes, while providing for the preservation of modified or deleted data.

Data Storage Subsystem Architecture

FIG. 1 and its discussion herein are intended to describe a general data storage subsystem environment in which the present invention can be practiced. The present invention is not limited to any single computing environment. Moreover, the architecture and functionality of the present invention as taught herein and would be understood by one skilled in the art is extensible to a number of computing environments and embodiments in keeping with the scope and spirit of the present invention.

FIG. 1 illustrates in block diagram form the architecture of the preferred embodiment of the parallel disk drive array data storage subsystem 100. The parallel disk drive array data storage subsystem 100 appears to the associated host processors 11–12 to be a collection of large form factor disk drives with their associated storage control, since the architecture of parallel disk drive array data storage subsystem 100 is transparent to the associated host processors 11–12. This parallel disk drive array data storage subsystem 100 includes a plurality of disk drives (for example 122-1 to 125-r) located in a plurality of disk drive subsets 103-1 to 103-i. The disk drives 122-1 to 125-r are significantly less expensive, even while providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5 ¼ inch form factor.

The architecture illustrated in FIG. 1 is that of a plurality of host processors 11–12 interconnected via the respective plurality of data channels 21, 22–31, 32, respectively to a data storage subsystem 100 that provides the backend data storage capacity for the host processors 11–12. This basic configuration is well known in the data processing art. The data storage subsystem 100 includes a control unit 101 that serves to interconnect the subsets of disk drives 103-1 to 103-i and their associated drive managers 102-1 to 102-i with the data channels 21–22, 31–32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel for example -21 from any host processor for example 11 to interconnect to a selected cluster control 111 within control unit 101. The cluster control 111 itself provides a pair of storage paths 200-0, 200-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive subset 103-1 with the plurality of optical fiber backend channels 104. Disk drive manager 102-1 includes an input/output circuit 120 that provides a hardware interface to interconnect the optical fiber backend channels 104 with the data paths 126 that serve control and drive circuits 121. Control and drive circuits 121 receive the data on conductors 126 from input/output circuit 120 and convert the form and format of these signals as required by the associated commodity disk drives in disk drive subset 103-1. In addition, control and drive circuits 121 provide a control signaling interface to transfer signals between the disk drive subset 103-1 and control unit 101.

The data that is written onto the disk drives in disk drive subset 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives for example an IBM 3380K type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive subset 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an ESDI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
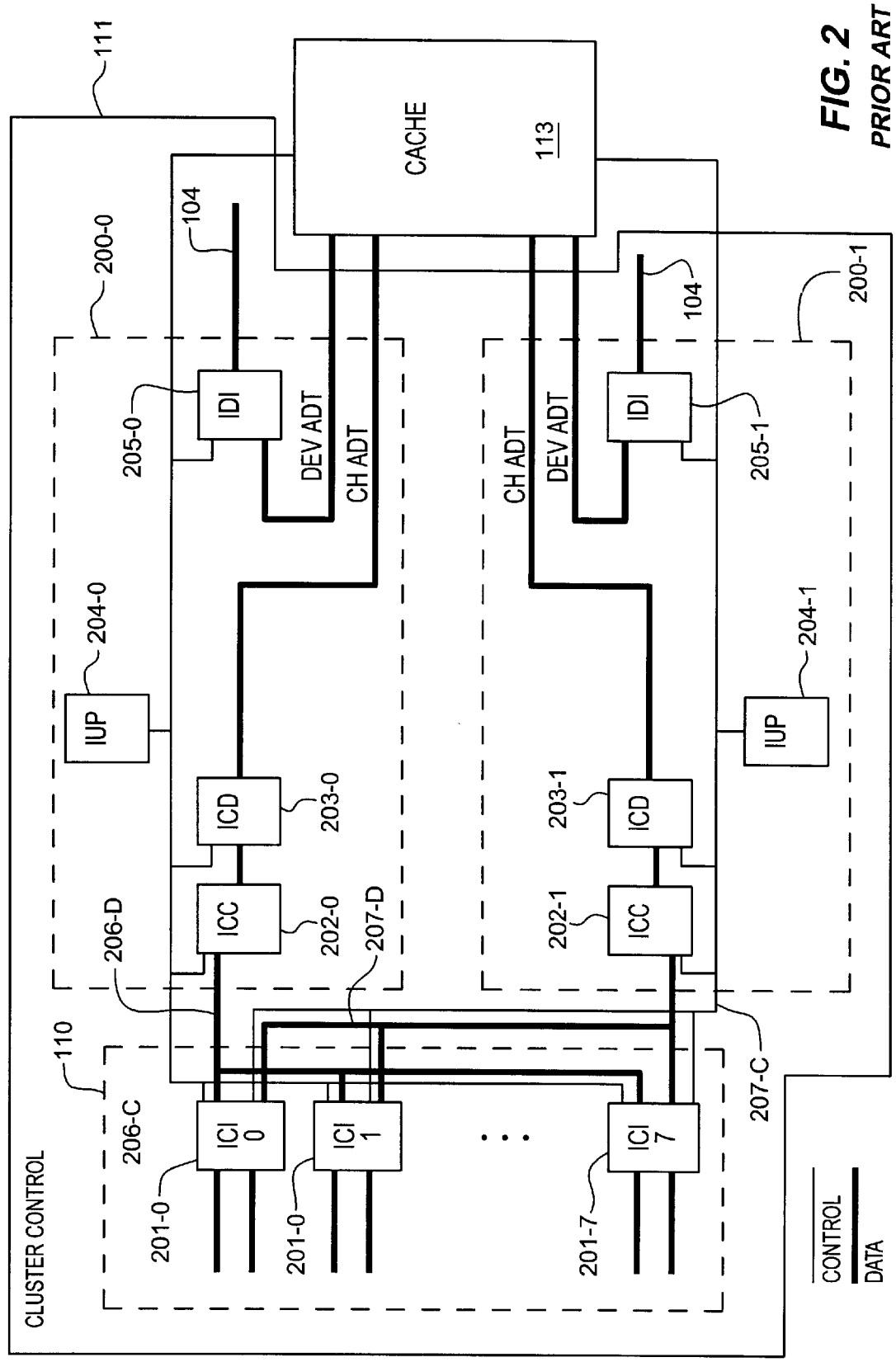
FIG. 2 illustrates the cluster control of the data storage subsystem.

FIG. 2 and its discussion herein are intended to describe a control unit environment in which the present invention can be practiced. The present invention is not limited to any single computing environment. Moreover, the architecture and functionality of the present invention as taught herein and would be understood by one skilled in the art is extensible to a number of computing environments and embodiments in keeping with the scope and spirit of the present invention.

FIG. 2 illustrates in block diagram form additional details of cluster control 111 Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, or 207-C, 207-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signaling format of optical fiber backend channels 104 and the metallic conductors contained within storage path 200-0. Channel interface control 202-0 operates under control of processor 204-0 to control the flow of data to and from cache memory 113 and one of the channel interface units 201 that is presently active with storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of the data channel 21 and the available data transfer capability of the cache memory 113. The data that is received by the channel interface control circuit 202-0 from a corresponding channel interface circuit 201 is forwarded to the cache memory 113 via channel data compression circuit 203-0. The channel data compression circuit 203-0 provides the necessary hardware and microcode to perform compression of the channel data for the control unit 101 on a data write from the host processor 11. It also performs the necessary decompression operation for control unit 101 on a data read operation by the host processor 11.

As can be seen from the architecture illustrated in FIG. 2, all data transfers between a host processor 11 and a redundancy group in the disk drive subsets 103 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement methods as well as other cache control functions. In addition, processor 204-0 creates the redundancy groups from the disk drives in disk drive subsets 103 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein, except for certain improvements to the free space collection function as embodied in the present invention.

Data Read Operation

Figure 3:
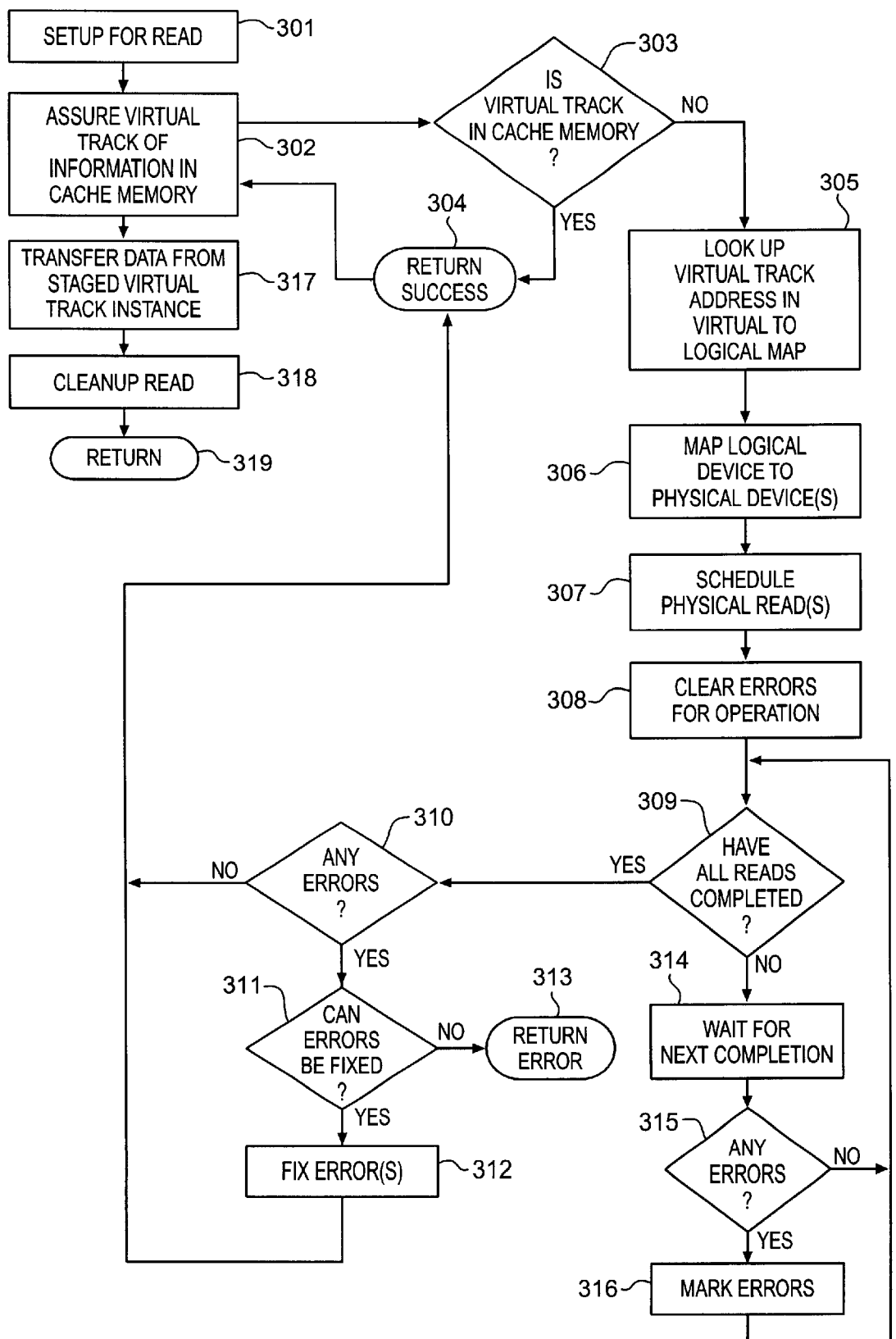
FIG. 3 illustrates, in flow diagram form, the operational steps taken to perform a data read operation.

FIG. 3 illustrates in flow diagram form the operational steps taken by processor 204 in control unit 101 of the data storage subsystem 100 to read data from a data redundancy group 122-1 to 122-n+m in the disk drive subsets 103. The parallel disk drive array data storage subsystem 100 supports reads of any size. However, the logical layer only supports reads of virtual track instances. In order to perform a read operation, the virtual track instance that contains the data to be read is staged from the logical layer into the cache memory 113. The data record is then transferred from the cache memory 113 and any clean up is performed to complete the read operation.

At step 301, the control unit 101 prepares to read a record from a virtual track. At step 302, the control unit 101 branches to the cache directory search subroutine to assure that the virtual track is located in the cache memory 113 since the virtual track may already have been staged into the cache memory 113 and stored therein in addition to having a copy stored on the plurality of disk drives (122-1 to 122-n+m) that constitute the redundancy group in which the virtual track is stored. At step 303, the control unit 101 scans the hash table directory of the cache memory 113 to determine whether the requested virtual track is located in the cache memory 113. If it is, at step 304 control returns back to the main read operation routine and the cache staging subroutine that constitutes steps 305–316 is terminated.

Assume, for the purpose of this description, that the virtual track that has been requested is not located in the cache memory 113. Processing proceeds to step 305 where the control unit 101 looks up the address of the virtual track in the virtual to logical map table. At step 306, the logical map location is used to map the logical device to one or more physical devices in the redundancy group. At step 307, the control unit 101 schedules one or more physical read operations to retrieve the virtual track instance from appropriate ones of identified physical devices 122-1 to 122-n+m. At step 308, the control unit 101 clears errors for these operations. At step 309, a determination is made whether all the reads have been completed, since the requested virtual track instance may be stored on more than one of the N+M disk drives in a redundancy group. If all of the reads have not been completed, processing proceeds to step 314 where the control unit 101 waits for the next completion of a read operation by one of the N+M disk drives in the redundancy group. At step 315 the next reading disk drive has completed its operation and a determination is made whether there are any errors in the read operation that has just been completed. If there are errors, at step 316 the errors are marked and control proceeds back to the beginning of step 309 where a determination is made whether all the reads have been completed. If at this point all the reads have been completed and all portions of the virtual track instance have been retrieved from the redundancy group, then processing proceeds to step 310 where a determination is made whether there are any errors in the reads that have been completed. If errors are detected then at step 311 a determination is made whether the errors can be fixed. If not, a return operation Performed in step 313. One error correction method is the use of a Reed-Solomon error detection/correction code to recreate the data that cannot be read directly. If the errors cannot be repaired then a flag is set to indicate to the control unit 101 that the virtual track instance can not be read accurately. If the errors can be fixed, then in step 312 the identified errors are corrected and processing returns back to the main routine at step 304 where a successful read of the virtual track instance from the redundancy group to the cache memory 113 has been completed.

At step 317, control unit 101 transfers the requested data record from the staged virtual track instance in which it is presently stored. Once the records of interest from the staged virtual track have been transferred to the host processor 11 that requested this information, then at step 318 the control unit 101 cleans up the read operation by performing the administrative tasks necessary to place all of the apparatus required to stage the virtual track instance from the redundancy group to the cache memory 113 into an idle state and control returns at step 319 to service the next operation that is requested.

Data Write Operation

Figure 4:
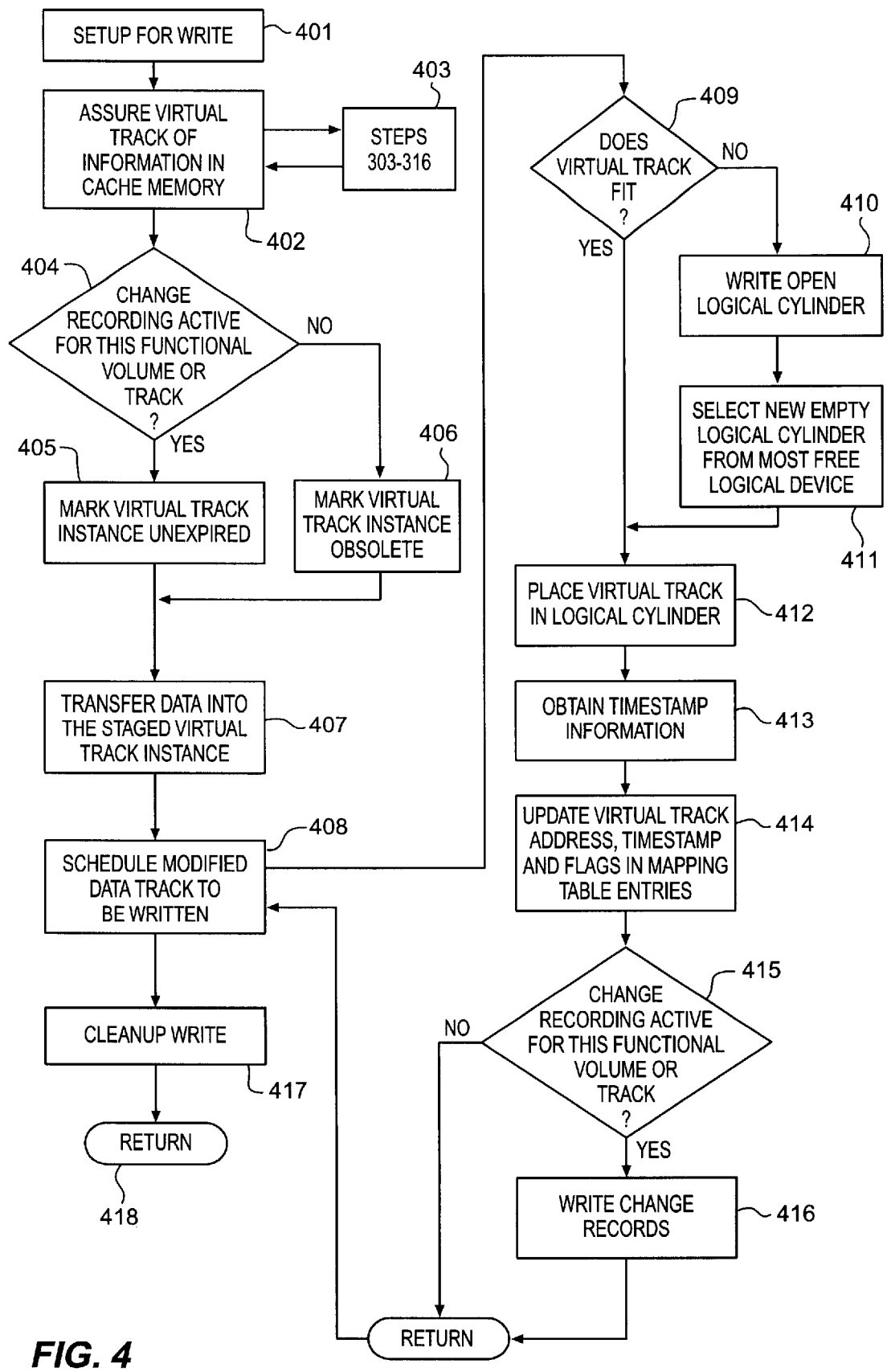
FIG. 4 illustrates, in flow diagram form, the operational steps taken to perform a data write operation.

FIG. 4 illustrates in flow diagram form the operational steps taken by the parallel disk drive array data storage subsystem 100 to perform a data write operation. The parallel disk drive array data storage subsystem 100 supports writes of any size, but again, the logical layer only supports writes of virtual track instances. Therefore in order to perform a write operation, the virtual track that contains the data record to be rewritten is staged from the logical layer into the cache memory 113. Once the write operation is complete, the location of the obsolete instance of the virtual track is marked as free space. The modified data record is then transferred into the virtual track and this updated virtual track instance is then scheduled to be written from the cache memory 113 where the data record modification has taken place into the logical layer. Any clean up of the write operation is then performed once this transfer and write is completed.

At step 401, the control unit 101 performs the set up for a write operation and at step 402, as with the read operation described above, the control unit 101 branches to the cache directory search subroutine to assure that the virtual track into which the data is to be transferred is located in the cache memory 113. Since all of the data updating is performed in the cache memory 113, the virtual track in which this data is to be written must be transferred from the redundancy group in which it is stored to the cache memory 113 if it is not already resident in the cache memory 113. The transfer of the requested virtual track instance to the cache memory 113 is performed for a write operation (indicated by step 403) as it is described above with respect to a data read operation and constitutes steps 303–316 illustrated in FIG. 3 above.

At step 404, the functional volume or track is checked to see whether change recording is active for the destination of the write operation. If change recording is active, step 405 is performed where the control unit 101 marks the virtual track instance that is stored in the redundancy group as unexpired; otherwise step 406 is performed to mark the virtual track as obsolete. In this manner, the logical location at which this virtual track instance is stored is not accessed in response to another host processor 12 attempting to read or write the same virtual track. Since the modified record data is to be written into this virtual track in the cache memory 113, the copy of the virtual track that resides in the redundancy group is now inaccurate and must be removed from access by the host processors 11–12.

At step 407, the control unit 101 transfers the modified record data received from host processor 11 into the virtual track that has been retrieved from the redundancy group into the cache memory 113 to thereby merge this modified record data into the original virtual track instance that was retrieved from the redundancy group. Once this merge has been completed and the virtual track now is updated with the modified record data received from host processor 11, the control unit 101 must schedule this updated virtual track instance to be written onto a redundancy group somewhere in the parallel disk drive array data storage subsystem 100.

This scheduling is accomplished by the subroutine that consists of steps 409–417. At step 409, the control unit 101 determines whether the virtual track instance as updated fits into an available open logical cylinder. If it does not fit into an available open logical cylinder, then at step 410 then this presently open logical cylinder must be closed out and written to the physical layer and another logical cylinder selected from the most free logical device or redundancy group in the parallel disk drive array data storage subsystem 100. At step 411, the selection of a free logical cylinder from the most free logical device takes place. This ensures that the data files received from host processor 11 are distributed across the plurality of redundancy groups in the parallel disk drive array data storage subsystem 100 in an even manner to avoid overloading certain redundancy groups while underloading other redundancy groups. Once a free logical cylinder is available, either being the presently open logical cylinder or a newly selected logical cylinder, then at step 412, the control unit 101 writes the updated virtual track instance into the logical cylinder. At step 413, the timestamp information is determined for this write operation. At step 414, the new location of the virtual track is placed in the virtual to logical map and the timestamp and flags in the mapping tables are updated in order to render it available to the host processors 11–12. Then, at step 415, if change recording is active, then step 416 is performed to write the change records to be associated with this data write operation. At step 417, control returns to the main routine, where at step 418 the control unit 101 cleans up the remaining administrative tasks to complete the write operation and return to an available state at 419 for further read or write operations from host processor 11.

Activation and Deactivation of Change Recording

Figure 5:
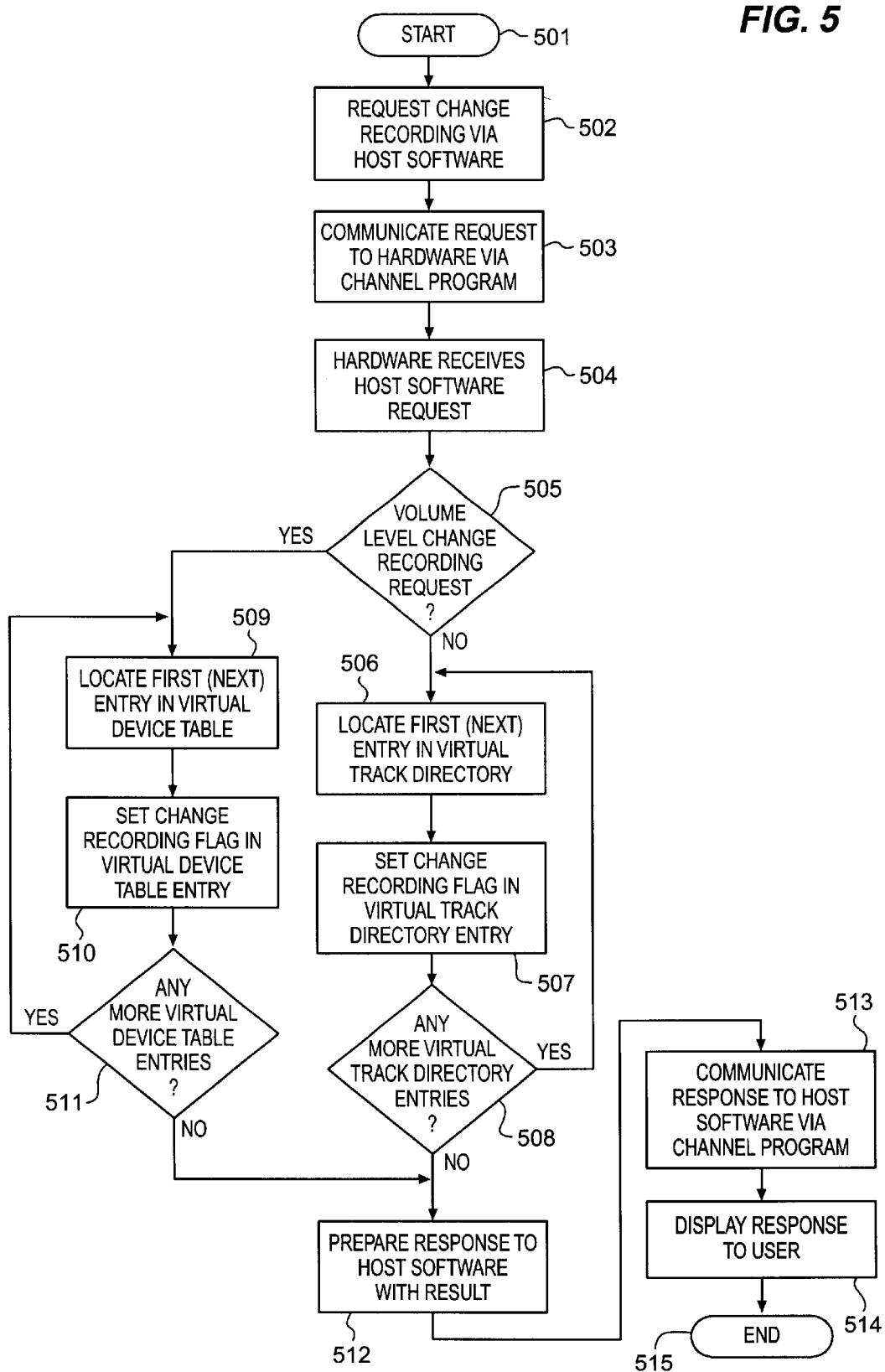
FIG. 5 illustrates, in flow diagram form, the operation steps taken for activating or deactivating change recording.

Turning now to FIG. 5, illustrated are the steps performed in an embodiment of the present invention for activating or deactivating Change Recording in an embodiment whereby a user initiates a request to activate or deactivate Change Recording and specifies which volumes, data sets, or tracks are involved. Processing begins at step 501, and proceeds to step 502 wherein Change Recording is requested to be activated or deactivated at either a volume level, data set level, or track level. A volume level request consists of a one more functional volumes. A data set level request consists of one or more ranges of functional tracks that describe a data set. A track level request consists of one or more individual functional tracks. In step 503, the request is communicated to the hardware via a channel program. The storage hardware receives in step 504 the change recording request initiated from the host software. In step 505, the request is checked to determine if this is a volume level request. If so, all related virtual device table entries must be updated in steps 509–511, by retrieving the first or next entry in the virtual device table (step 509), and setting the change recording flag in the virtual device table entry (step 510), until all virtual device table entries for the request have been updated as determined in step 511. If this is a data set or track level request, all related virtual track directory entries must be updated in steps 506–508, by retrieving the first or next entry in the virtual track directory (step 506), and setting the change recording flag in the virtual track directory entry (step 507), until all virtual track directory entries for the request have been updated as determined in step 508. Processing continues in step 512 wherein a message is prepared to respond to the host software to indicate whether or not the request was successfully processed. This response is communicated to the host software via the channel program in step 513, with the result being displayed to the user by the host software in step 514. Processing of this request is then complete as indicated by step 515.

Free Space Directory and Mapping Tables

Figure 6:
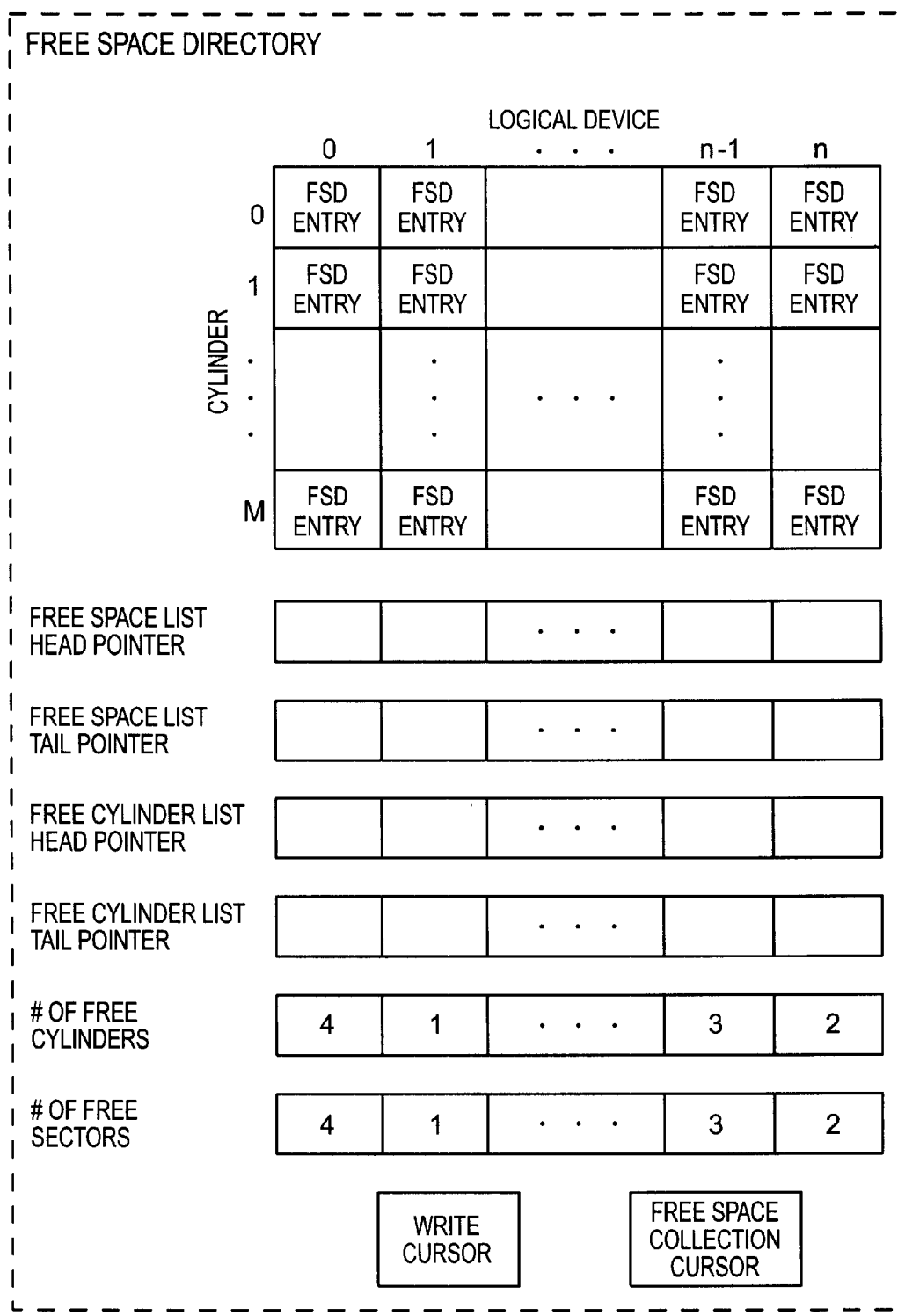
FIG. 6 illustrates a typical free space directory used in the data storage subsystem.
Figure 9:
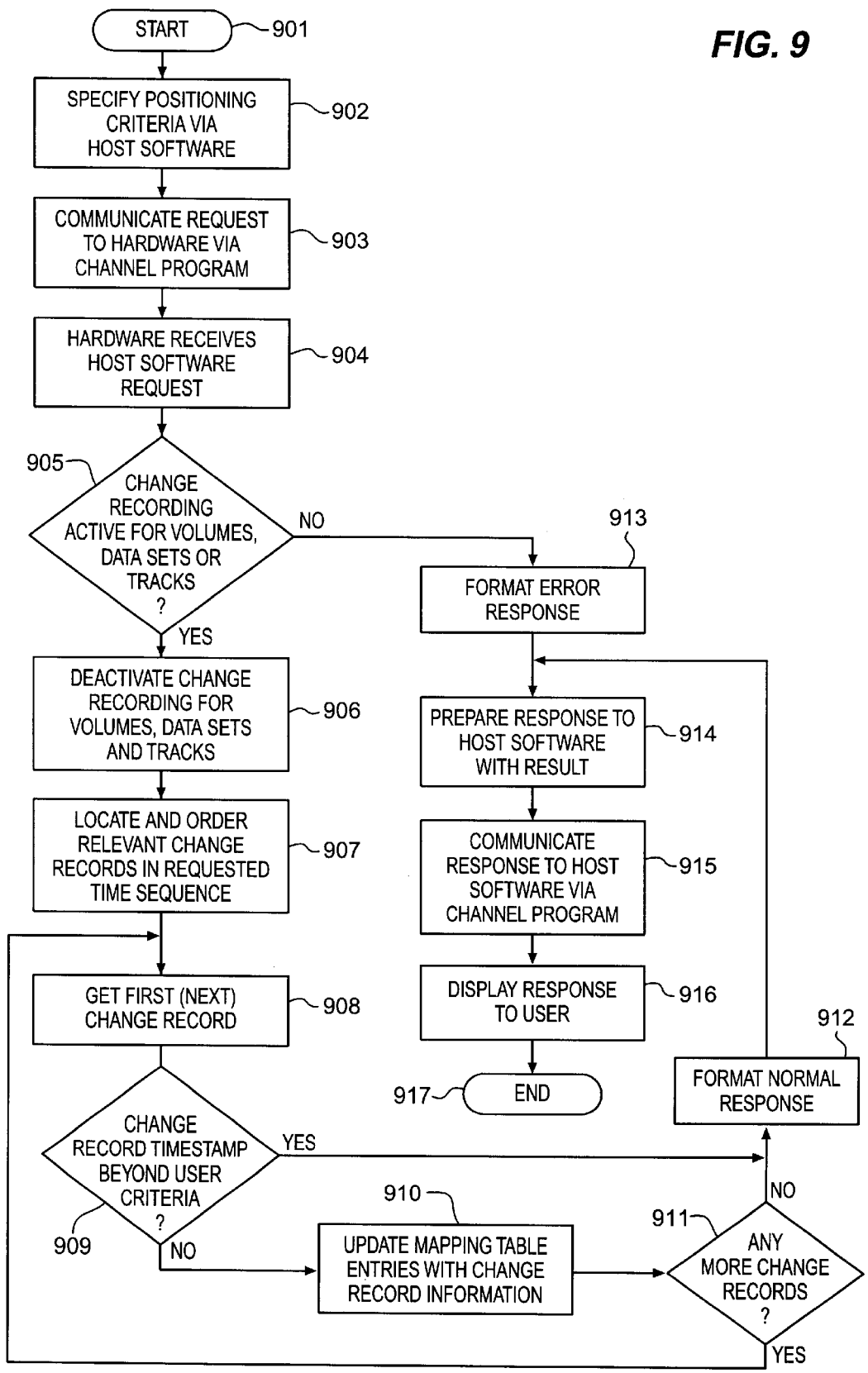
FIG. 9 illustrates, in flow diagram form, the operational steps taken for recovery of previously modified or deleted data.

The storage control also includes a free space directory as illustrated in FIG. 6, which is also presented as FIG. 9 in Belsan et al., U.S. Pat. No. 5,193,184, issued Mar. 9, 1993, which is hereby incorporated by reference. The free space directory is a list of all of the logical cylinders in the parallel disk drive array data storage subsystem 100 ordered by logical device. Each logical device is cataloged in a list called a free space list for the logical device; each list entry represents a logical cylinder and indicates the amount of free space that this logical cylinder presently contains. This free space directory contains a positional entry for each logical cylinder; each entry includes both forward and backward pointers for the doubly linked free space list for its logical device and the number of free sectors contained in the logical cylinder. Each of these pointers points either to another entry in the free space list for its logical device or is null. The collection of free space is a background process that is implemented in the parallel disk drive array data storage subsystem 100. The free space collection process makes use of the logical cylinder directory, which is a list contained in the first sector of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Figure 7:
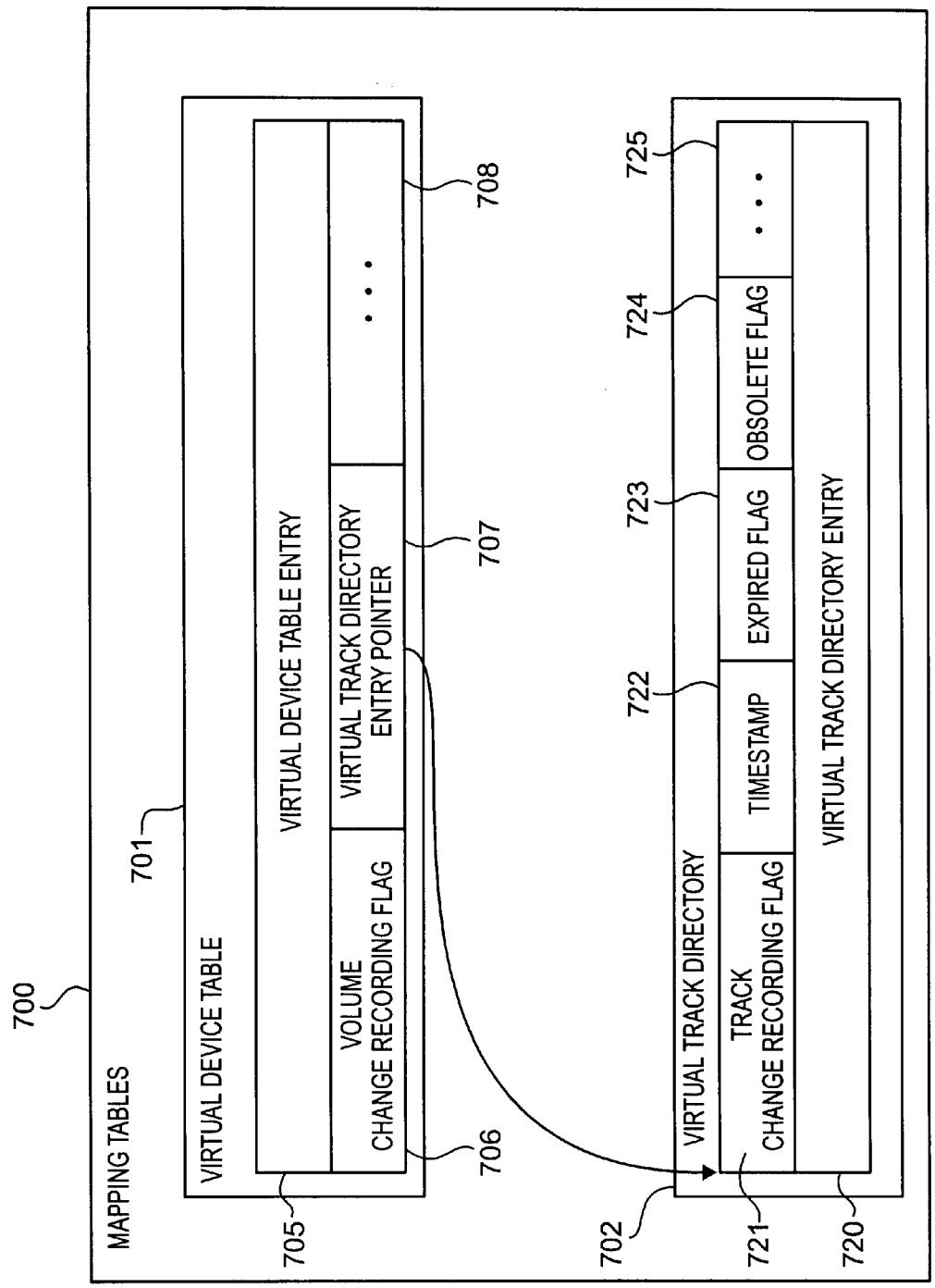
FIG. 7 illustrates mapping tables including a virtual device table and a virtual track directory.

Turning now to FIG. 7, illustrated are mapping tables used in an embodiment of the present invention. These mapping tables are used to describe the virtual to logical mapping of data stored in the parallel disk drive array data storage subsystem. Mapping tables are further described in Belsan et al., U.S. Pat. No. 5,193,184, issued Mar. 9, 1993, which is hereby incorporated by reference, and Ludlam et al., U.S. Pat. No. 5,459,857, issued Oct. 17, 1995, which is hereby incorporated by reference. FIG. 7 illustrates fields of the mapping tables 700 that are directly related to the present invention.

Virtual device table 701 contains virtual device table entries 705 which contains several fields used to identify the state of a volume. In an embodiment of the present invention, these fields include a volume change recording flag 706 which indicates whether or not change recording is activated for the volume, a virtual track directory entry pointer 707 which is a pointer to a virtual track directory entry 720; and miscellaneous other fields 708 used depending on the exact implementation of an embodiment of the present invention.

Virtual track directory 702 contains virtual track directory entries 720 which contains several fields used to identify the state of a track of data. In an embodiment of the present invention, these fields include a track change recording flag 721 which indicates whether or not change recording is activated for the track; timestamp 722 indicating the time of the change; and expired flag 723 which indicates whether or not the data is expired when change recording is activated for the track; obsolete flag 724 which indicates whether or not the data is obsolete when change recording is not activated for the track; and miscellaneous other fields 725 used depending on the exact implementation of an embodiment of the present invention. As would be understood by one skilled in the art and in keeping with the scope and spirit of the present invention, the present invention is not limited to the specific embodiment described herein, but a multitude of varying data structures could be used for the mapping tables.

Free Space Collection

The present invention modifies the free space collection process of prior art systems and approaches to allow for the temporary preservation of modified or deleted data for a duration in which this data could be recovered. Modified or deleted data is temporarily preserved only for those functional volumes, data sets, and tracks that have Change Recording active. Within this duration, this data is considered "unexpired". When change recording is not active, modified or deleted data is considered "obsolete" and is "collectable", or available for reclamation the next time the background free space collection process is performed. After this duration for maintaining the previously modified or deleted data, the space occupied by the data can then be reused. The present invention provides for numerous different methods for determining this duration, including this duration being a function of the available storage space available (i.e., when a predetermined amount of disk space has been used in total or is occupied by expired data), or a function of a predetermined period of time after the data has been modified or deleted (i.e., keep for 15 minutes), or some combination of these factors and/or other factors as would be apparent to one skilled in the art and in keeping within the scope and spirit of the present invention.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space.

As data is modified or deleted, the redundancy groups increasingly contain numerous tracks of unexpired and obsolete data, causing the total available free space of the data storage subsystem to decrease. To counteract this effect, a background free space collection process is periodically performed by control unit 101 that examines logical cylinders containing obsolete data to determine if the valid data may be relocated elsewhere and so transform the logical cylinder into contiguous free space. Control unit 101 selects a logical cylinder that needs to be collected as a function of how much free space it contains.

The free space determination is based on the free space directory as illustrated in FIG. 6, which indicates the availability of unused memory in data storage subsystem 100. The table illustrated in FIG. 6 is a listing of all of the logical devices contained in data storage subsystem 100 and the identification of each of the logical cylinders contained therein. The entries in this chart represent the number of free physical sectors in this particular logical cylinder. A write cursor is maintained in memory and this write cursor indicates the available open logical cylinder that control unit 101 will write to when data is destaged from cache 113 after modification by associated host processor 11–12 or as part of a free space collection process. In addition, a free space collection cursor is maintained which points to the present logical cylinder that is being cleared as part of a free space collection process. Therefore, control unit 101 can review the free space directory illustrated in FIG. 6 as a backend process to determine which logical cylinder on a logical device would most benefit from free space collection.

If the selected logical cylinder contains any unexpired tracks, further free space collection processing of the logical cylinder is bypassed and the next candidate logical cylinder is selected for processing.

If the selected logical cylinder contains no unexpired tracks, control unit 101 activates the free space collection process by opening a previously emptied logical cylinder to eventually be written, or "destaged", to the back-end disk storage devices. Control unit 101 reads all of the valid data from the selected logical cylinder into cache memory 113. The "collected" logical cylinder is then listed as completely empty, since all of the virtual track instances therein are marked as obsolete. Additional logical cylinders are collected for free space collection purposes or as data is received from an associated host processor 11–12 until a complete logical cylinder has been filled. Once a complete logical cylinder has been filled, the destage logical cylinder is written to the back-end disk storage devices and a new previously emptied logical cylinder is opened.

Figure 8:
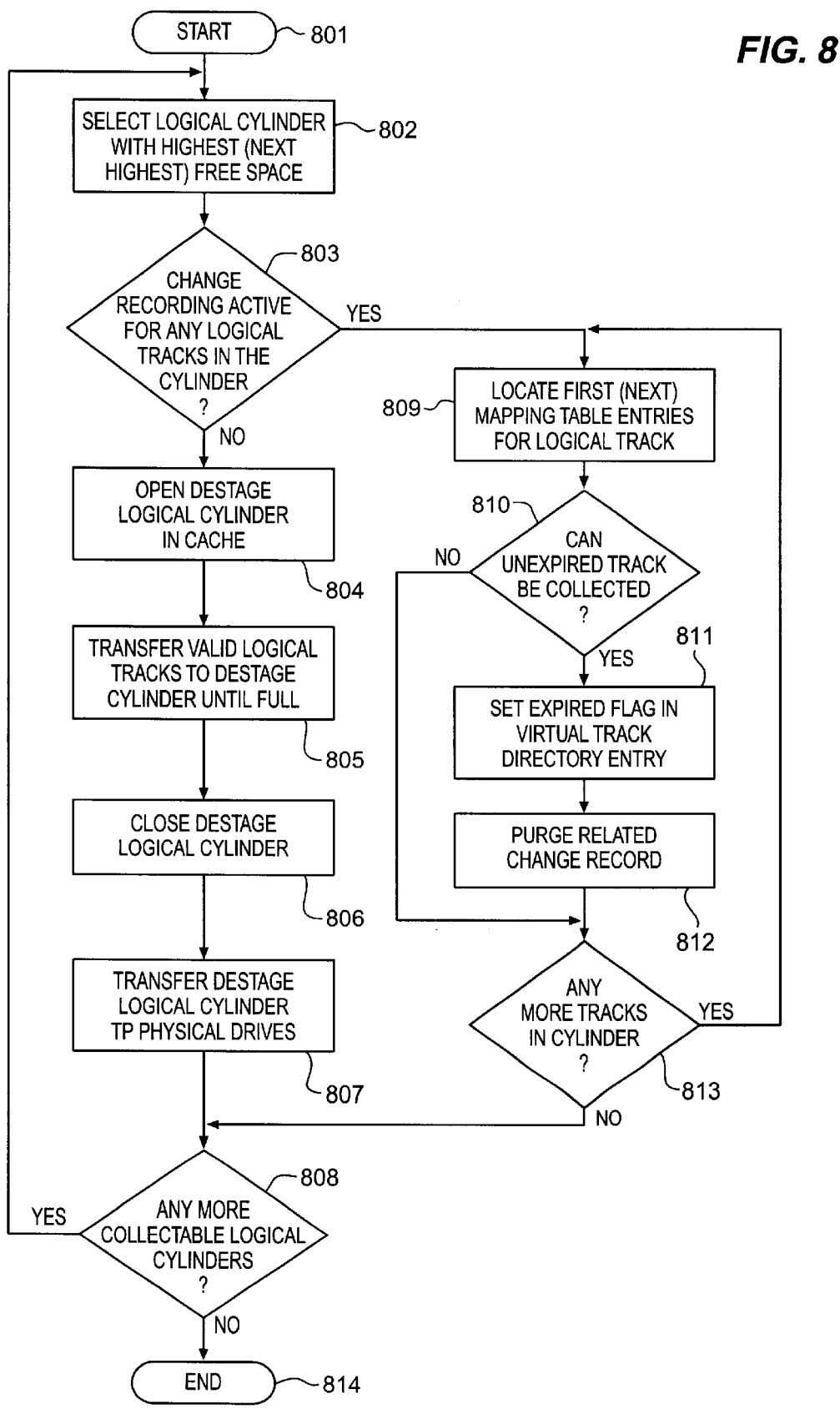
FIG. 8 illustrates, in flow diagram form, the operational, steps taken for free space collection.

FIG. 8 illustrates in flow diagram form the operational steps taken by processor 204 to implement the free space collection process in accordance with the present invention. Processing begins at step 801 and proceeds to step 802 where the logical cylinder with the highest free space is selected. Next, if change recording is active for any of the logical tracks in the logical cylinder as determined in step 803, then steps 809–813 are performed until all logical tracks in the logical cylinder have been processed as determined in step 813. Step 809 is performed to locate the first or next virtual to logical mapping table entries for each logical track in the logical cylinder, depending on whether this is the first or next logical track in the logical cylinder. Next, using a method to dynamically determine if the unexpired track should be expired and collected as free space, as determined in step 810, the expired flag 723 in the virtual track directory entry 720 is set in step 811 to indicate the track is expired. Next, step 812 purges the change record related to this change so that the just-expired mapping table entries can not be restored. When all tracks in the cylinder have been processed, processing of FIG. 8 proceeds to step 808 to determine if there are more collectable logical cylinders to process. If so, the entire process repeats beginning with step 802 where the logical cylinder with the next highest free space is selected.

Otherwise, if change recording is not active for any of the logical tracks in the logical cylinder as determined in step 803, step 804 is performed to open the destage logical cylinder in cache memory 113. Then, in step 805, valid logical tracks are transferred to the destage logical cylinder until it is full. Then, in step 806, the destage cylinder is closed, with its contents being transferred to the physical drives in step 807. Next, step 808 is performed to determine if there are more collectable logical cylinders to be processed. If so, these are processed according to the flow diagram as previously described, otherwise processing of FIG. 8 is complete as indicated by step 814.

Recovery of Previously Modified or Deleted Data

Turning now to FIG. 9, illustrated are the steps performed in an embodiment of the present invention for recovering previously modified or deleted data. In an embodiment, a user initiates and determines positioning criteria, such as a time value, to which the state of the data is recovered. As would be understood by one skilled in the art and in keeping with the scope and spirit of the present invention, the present invention is not limited to the specific embodiment described herein, but a multitude of ways could be used to specify the positioning criteria, such as a relative change number, where positive or negative integers represent past or future changes respectively.

Processing begins with step 901 and proceeds to step 902 wherein a user specifies the positioning criteria via the host software, which determines the time to which to the state of the data is recovered. In step 903, the request is communicated to the storage hardware via a channel program, and the hardware receives the host software request in step 904. Next, as determined in step 905, if change recording is active for the requested volumes, data sets, or tracks, then step 906 is performed to deactivate change recording for those volumes, data sets, and tracks to prevent the recording of changes caused by Change Processing itself. Next, as indicated by step 907, the relevant change records are located and ordered in the appropriate time sequence. Step 908 then selects the first or next relevant change record to be processed. Until all relevant change records are processed, steps 908–911 are performed to recover the previously modified or deleted data. As the change records are preferably accessed in time order, once a change record timestamp is evaluated beyond the user specified positioning criteria, as determined in step 909, processing of the change records is complete. Otherwise, in step 910, the mapping table entries are updated with the information contained in the change record. When step 909 has determined that processing of the relevant change records is complete, step 912 is performed to prepare a successful response. If change recording was not active, step 913 is performed is performed to prepare an error response. Next, processing continues in step 914 wherein a message is prepared to respond to the host software to indicate whether or not the request was successfully processed. This response is communicated to the host software via the channel program in step 915, with the result being displayed to the user by the host software in step 916. Processing of this request is then complete as indicated by step 917. While a specific embodiment of this invention has been disclosed herein, it is expected that those skilled in the art can design other embodiments that differ from this particular embodiment but fall within the scope of the appended claims.

I claim:

1. A data recovery system for recovering a previously modified data item, comprising:

a data item at a first location;

means for modifying the data item and locating the modified data item at a second location;

means for associating the data item at the first location to a set of unexpired data;

means for free space collection for reuse of space occupied by at least a subset of data of the set of the unexpired data, wherein the means for free space collection includes means for comparing positioning criteria associated with an element within the set of unexpired data to determine whether the element is available for expiration and collection; and means for recovering the data item from the set of unexpired data.

2. A data recovery system for recovering a previously modified data item, comprising:

a data item at a first location;

means for modifying the data item and locating the modified data item at a second location;

means for associating the data item at the first location to a set of unexpired data;

means for free space collection for reuse of space occupied by at least a subset of data of the set of the unexpired data, wherein the means for free space collection includes means for determining available disk storage or memory space available for the set of unexpired data, and means for comparing the determined available space to determine whether the element is available for expiration and collection; and means for recovering the data item from the set of unexpired data.

3. A memory system for storing a set of data records for at least one associated data processor, the set of data records including an original data record located at a first location, comprising:

means for reading and writing the set of data records;

means for modifying the original data record from the set of data records, and locating the modified data record at a second location while maintaining the original data record;

means for maintaining a change record associated with the original data record while the original data record is unexpired;

means for comparing a timestamp associated with the change record with positioning criteria to determine whether the original data record has expired; and means for purging the change record associated with the original data record when the original data record has expired.

4. The memory system of claim 3, further comprising means for specifying the positioning criteria.

5. A memory system for storing a set of data records for at least one associated data processor, the set of data records including an original data record located at a first location, comprising:

means for reading and writing the set of data records;

means for modifying the original data record from the set of data records, and locating the modified data record at a second location while maintaining the original data record;

means for maintaining a change record associated with the original data record while the original data record is unexpired, wherein the change record includes a timestamp value and an expired flag; and means for purging the change record associated with the original data record when the original data record has expired, wherein a virtual track directory entry associated with the modified data record includes a track change recording flag to indicate whether or not change recording is activated.

6. The memory system of claim 5, wherein the virtual device table entry further includes a volume change recording flag to indicate whether or not change recording is activated.

7. The memory system of claim 6, further comprising means for collecting unexpired data records exceeding a threshold.

8. The memory system of claim 7, wherein the means for collecting unexpired data records exceeding a threshold includes means for collecting obsolete data records.

9. A memory system for storing a set of data records for at least one associated data processor comprising:

means for reading and writing the set of data records;

means for deleting a data record from the set of data records while maintaining the data record in memory;

means for maintaining a change record associated with the data record while the data record is unexpired;

means for comparing a timestamp associated with the change record with positioning criteria to determine whether the data record has expired; and means for purging the change record associated with the data record when the data record has expired.

10. The memory system of claim 9, further comprising means for specifying the positioning criteria.

11. A memory system for storing a set of data records for at least one associated data processor comprising:

means for reading and writing the set of data records;

means for deleting a data record from the set of data records while maintaining the data record in memory;

means for maintaining a change record associated with the data record while the date record is unexpired, wherein the change record includes a timestamp value and an expired flag; and means for purging the change record associated with the data record when the data record has expired.

12. The memory system of claim 11, wherein a virtual track directory entry associated with the deleted data record includes a track change recording flag to indicate whether or not change recording is activated.

13. The memory system of claim 12, wherein the virtual device table entry further includes a volume change recording flag to indicate whether or not change recording is activated.

14. The memory system of claim 13, further comprising means for collecting unexpired data records exceeding a threshold.

15. The memory system of claim 14, wherein the means for collecting unexpired data records exceeding a threshold includes means for collecting obsolete data records.

* * * * *